Sept. 29, 1931.  R. KAMADA  1,825,526
FLUID OPERATED PRIME MOVER DYNAMO ELECTRIC PLANT
Filed Oct. 8, 1930
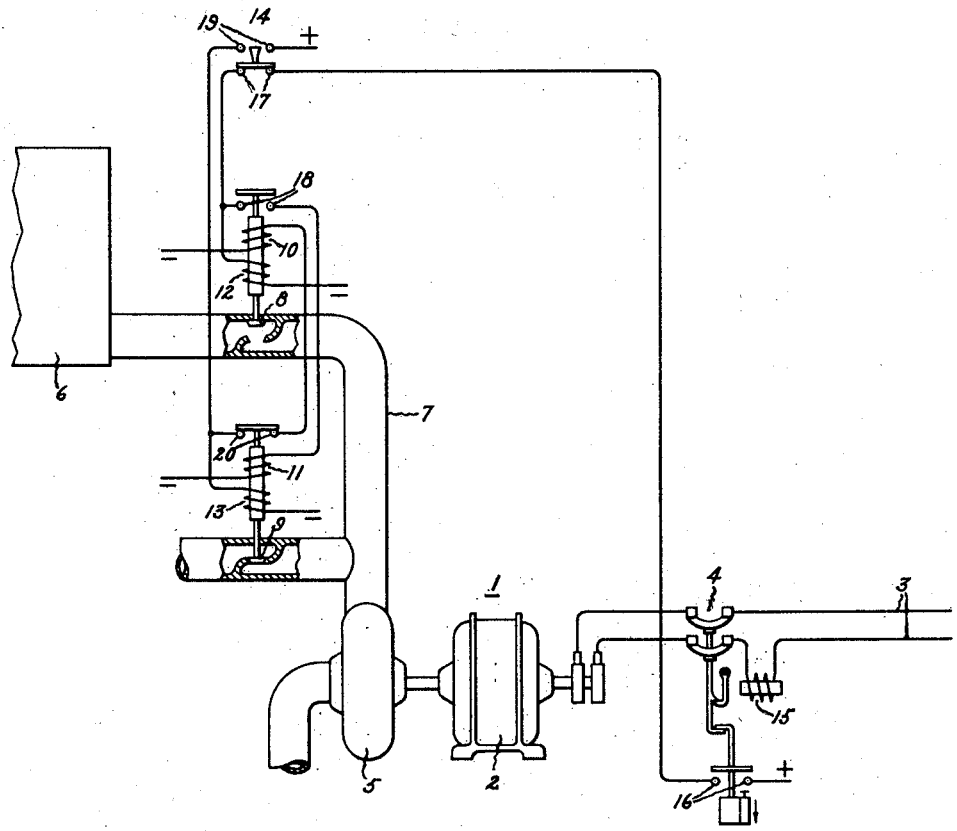
Inventor:
Rinpei Kamada,
by Charles E. Tullar
His Attorney.

Patented Sept. 29, 1931

1,825,526

UNITED STATES PATENT OFFICE

RINPEI KAMADA, OF YOKOHAMA, JAPAN, ASSIGNOR TO GENERAL ELECTRIC COMPANY, A CORPORATION OF NEW YORK

FLUID OPERATED PRIME MOVER DYNAMO-ELECTRIC PLANT

Application filed October 8, 1930, Serial No. 487,271, and in Japan November 16, 1929.

My invention relates to fluid operated prime mover dynamo-electric plants and one object of my invention is to provide an arrangement for automatically draining the fluid from the penstock, which supplies fluid to the plant, when predetermined abnormal conditions occur which cause the plant to shut down.

In hydroelectric plants which are located in places where the weather is extremely cold in the winter, there is danger of the water in the penstock freezing in case the flow of water therein stops during the extremely cold weather. In order to prevent this freezing, I provide, in accordance with my invention, an arrangement whereby the supply of water to the penstock is cut off and the water in the penstock is drained upon the occurrence of predetermined abnormal conditions on the electric system supplied by the dynamo-electric plant. Since it is uneconomical to drain the water from the penstock each time the plant is shut down, I preferably designed my arrangement so that the water is drained only in cases where the abnormal condition, which causes the station to shut down, is of a character necessitating a relatively long shut-down of the station.

My invention will be better understood from the following description, when taken in connection with the accompanying drawing and its scope will be pointed out in the appended claims.

In the accompanying drawing, 1 represents a hydroelectric plant including a generator 2 which is arranged to be connected to a load circuit 3 by means of a suitable circuit breaker 4 and a water wheel 5 which is arranged to receive water from a suitable reservoir 6 through a penstock 7. The plant 1 may be provided with any suitable control and regulating means, examples of which are well known in the art, for starting, regulating and stopping the water wheel 5 and for controlling the connection between the generator 2 and the load circuit 3. In order to simplify the disclosure, however, I have omitted all such means except that I have shown a circuit breaker of the over-load type whereby it is opened in response to a predetermined abnormal current flowing through the circuit breaker.

In accordance with my invention, I provide in the penstock 7, a suitable cut-off valve 8 for controlling the supply water from the reservoir 6 to the penstock and a suitable drain valve 9 for draining the water from the penstock 7. These valves are controlled by the circuit breaker 4 so that if the circuit breaker remains open for a predetermined length of time, the cut-off valve 8 is closed to cut off the supply of water to the penstock 7 and then the drain valve 9 is opened to drain the penstock. As shown, the valves 8 and 9 are respectively provided with the opening solenoids 10 and 11 and the closing solenoids 12 and 13. Any other suitable operating means, examples of which are well known in the art, may be provided however for effecting the opening and closing of these valves.

In order to control these valves so that the penstock 7 may be re-filled with water, I provide a manually controlled switch 14 which is arranged to control the circuits of the opening and closing coils of the valves 8 and 9 so as to effect this result.

The operation of the arrangement shown in the drawing is as follows:

When the plant 1 is in operation, the cut-off valve 8 is open and the drain valve 9 is closed and the circuit breaker 4 between the generator 2 and the load circuit 3 is closed.

When an abnormal condition occurs on the load circuit so that the current supplied from the generator 2 to the load circuit 3 exceeds a predetermined value, the trip coil 15, associated with the circuit breaker 4, effects the opening thereof in a manner well known in the art. If the circuit breaker 4, which may be reclosed in any suitable manner examples of which are well known in the art, is not reclosed within a predetermined time, the auxiliary contacts 16 on the circuit breaker 4 close and complete an energizing circuit for the closing coil 12 of the cut-off valve 8. This circuit includes the normally closed contacts 17 of the control switch 14. As soon as the cut-off valve 8 is completely closed, auxiliary contacts 18 on the valve complete an energizing circuit for the opening coil 11 of the drain valve 9. This valve opens and drains the water from the penstock 7.

If the circuit breaker 4 is reclosed before the auxiliary contacts 16 of the circuit breaker close, it will be obvious that the above described operation of the valves 8 and 9 does not take place to effect the draining of the water from the penstock 7.

When it is desired to re-fill the penstock 7, the control switch 14 is operated so as to open its contacts 17 and close its contacts 19, thereby completing an energizing circuit for the closing coil 13 of the drain valve 9. As soon as the drain valve is completely closed, the auxiliary contacts 20 complete an energizing circuit for the opening coil 10 of the cut-off valve 8 so that water is supplied to the penstock from the reservoir 6.

While I have, in accordance with the patent statutes, shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States is:

1. In combination, an electric circuit, a generator connected to said circuit, means for disconnecting said generator from said circuit, a prime mover driving said generator, a source of fluid for said prime mover, a penstock connecting said source of fluid to said prime mover and means controlled by said disconnecting means for draining the fluid from said penstock.

2. In combination, an electric circuit, a generator connected to said circuit, means for disconnecting said generator from said circuit, a prime mover driving said generator, a source of fluid for said prime mover, a penstock connecting said source of fluid to said prime mover and means controlled by said disconnecting means after said generator has been disconnected from said circuit for a predetermined time for shutting off the flow of fluid from said source to said penstock and for draining the fluid from said penstock.

3. In combination, an electric circuit, a generator connected to said circuit, means responsive to a predetermined abnormal electric condition of said circuit for effecting the disconnection of said generator from said circuit, a prime mover driving said generator, a source of fluid for said prime mover, a penstock connecting said source of fluid to said prime mover, and means responsive to the disconnection of said generator from said circuit for draining the fluid from said penstock if said generator remains disconnected for a predetermined time.

4. In combination, an electric circuit, a generator connected to said circuit, means responsive to predetermined abnormal electric conditions of said circuit for effecting the disconnection of said generator from said circuit, a prime mover driving said generator, a source of fluid for said prime mover, a penstock connecting said source of fluid to said prime mover, means for shutting off the flow of fluid from said source to said penstock in response to the disconnection of said generator from said circuit and means controlled by said shutting off means for draining said penstock of the fluid therein after said shutting off means has shut off the flow of fluid from said source to said penstock.

5. In combination, a fluid operated dynamo electric plant including a penstock for supplying fluid thereto, a source of fluid therefor, and means controlled by a predetermined abnormal condition of said plant for cutting off the supply of fluid from said source and said penstock and for draining the fluid from said penstock.

In witness whereof, I have hereunto set my hand this sixteenth day of September, 1930.

RINPEI KAMADA.